Feb. 17, 1931.　　　W. L. ROCKSTAD　　　1,792,711
DEMOUNTABLE RIM SECURING NUT
Filed April 3, 1929　　　2 Sheets-Sheet 1

Inventor
Walmer L. Rockstad,
By J. Stanley Burch
Attorney

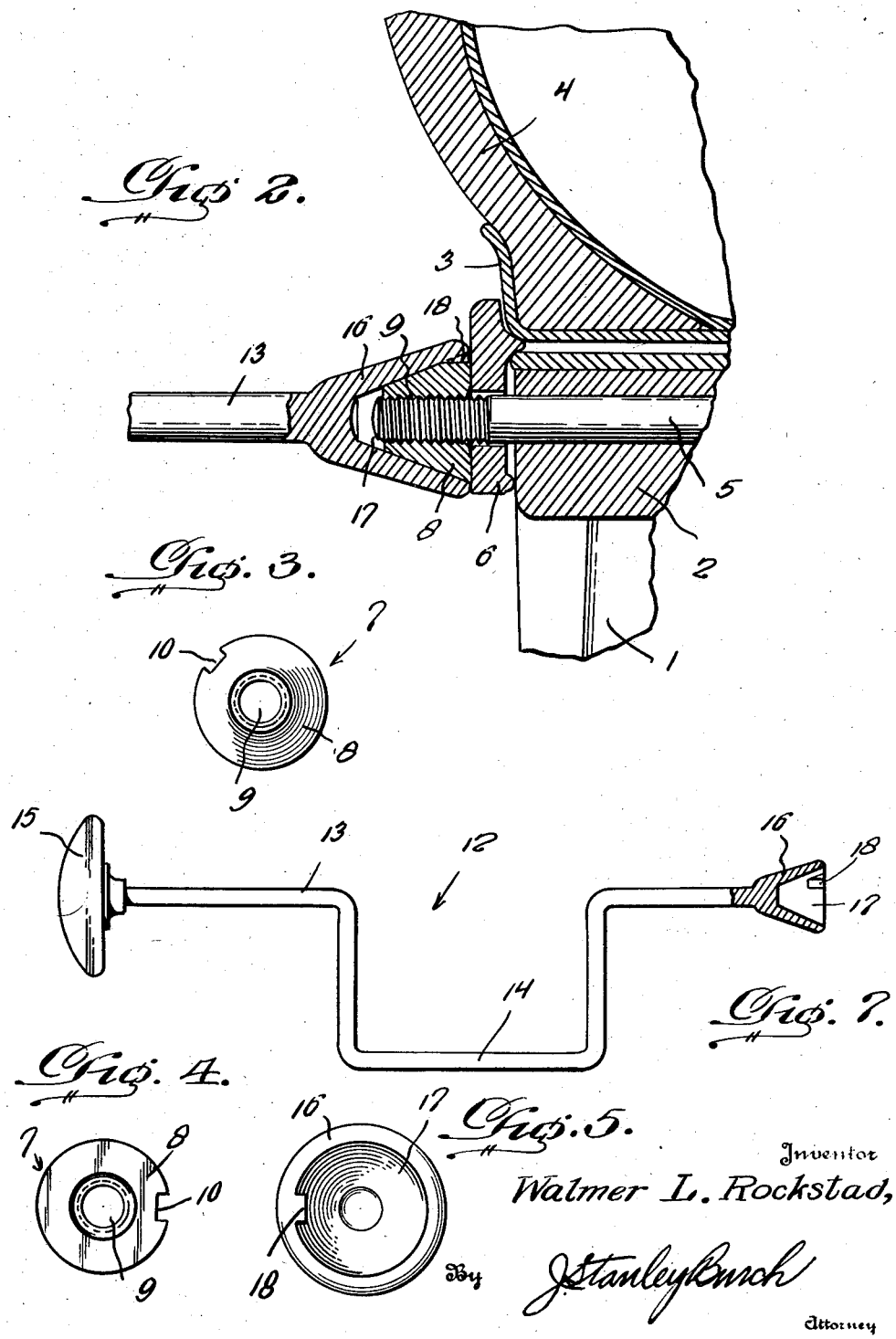

Patented Feb. 17, 1931

1,792,711

UNITED STATES PATENT OFFICE

WALMER L. ROCKSTAD, OF EVERETT, WASHINGTON

DEMOUNTABLE-RIM-SECURING NUT

Application filed April 3, 1929. Serial No. 352,123.

The present invention relates to improvements in nuts and has reference more particularly to a nut for association with a complementary bolt that extends transversely through the felly of an automobile wheel or spare tire rack to secure a demountable rim thereon.

One of the important objects of the present invention is to provide a nut that is of such construction as to require the use of a special tool to apply or remove the nut from its bolt so that an ordinary wrench or tool cannot be employed for removing or loosening the nut.

A still further object of the invention is to provide an improved nut construction of the above-mentioned character which will protect the tire mounted on the rim of an automobile wheel from being removed by any unauthorized person when an ordinary monkey or lug-nut wrench is attempted to be used to loosen the nut.

A still further object is to provide a nut of the above-mentioned character which is simple in construction, inexpensive, strong and durable and further well adapted for the purposes for which it is designed.

Other objects and advantages of the invention will become apparent from the following description when taken in connection with the accompanying drawing.

In the accompanying drawings wherein like reference characters indicate corresponding parts throughout the same:

Figure 2 is a sectional view taken approximately on the line 2—2 of Figure 1 showing the special tool engaged over the nut to tighten or loosen the same, the socket portion of the tool being shown in section.

Figure 3 is an end elevation of the nut looking at the outer end thereof.

Figure 4 is a similar view looking at the inner end of the nut.

Figure 5 is a face view of the socket of the special tool that is employed to actuate the nut.

Figure 7 is an elevational view of the special wrench showing the socket portion in section.

Figure 1:
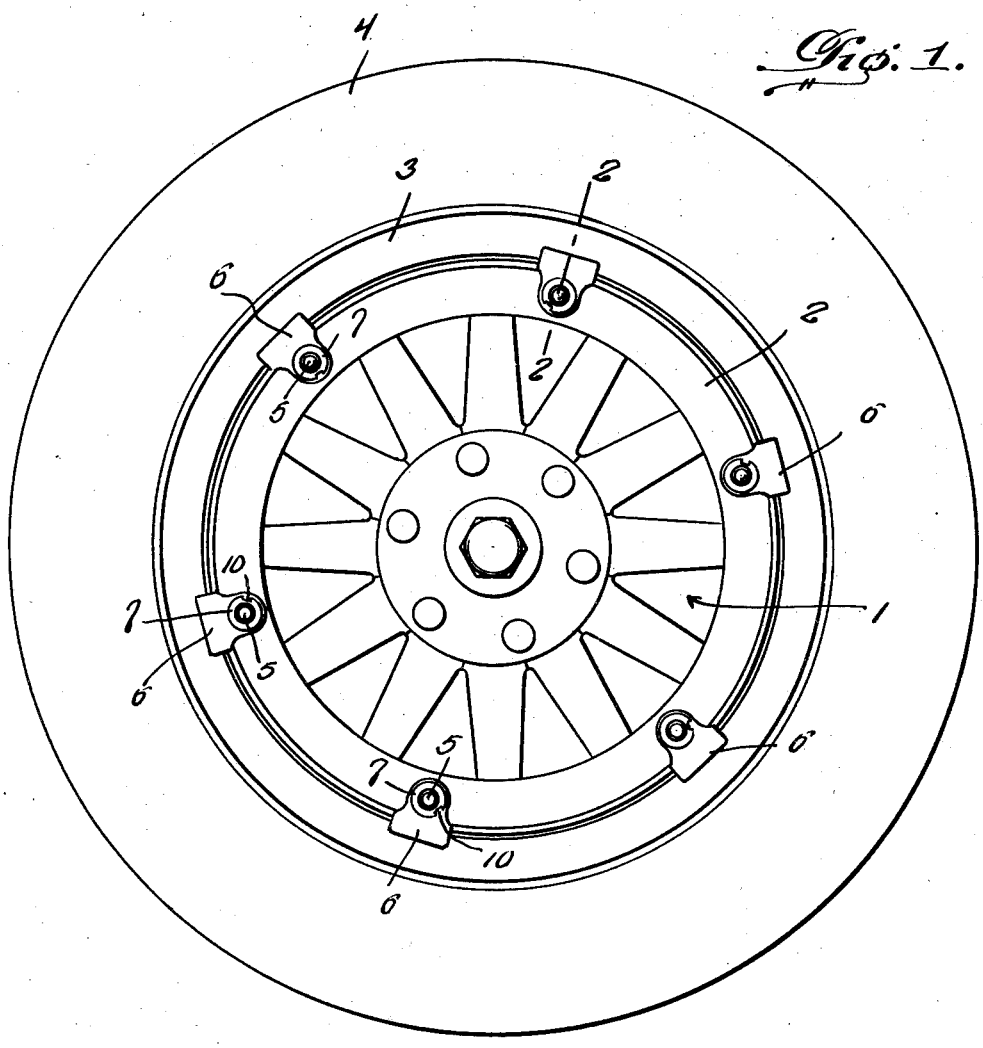
Figure 1 is a side elevation of an automobile wheel showing my improved nut as associated with each of the bolts that cooperate with the removable lugs to secure the tire supporting rim on the automobile wheel.

In the drawings wherein for the purpose of illustration is shown the preferred embodiment of my invention, the numeral 1 designates generally an automobile wheel including the tire rim supporting felly 2, the tire rim that is demountably secured on the felly being indicated by the numeral 3 while the pneumatic tire is shown at 4.

A series of headed bolts 5 extend transversely through the felly 2 at spaced intervals, the heads of the bolts being adapted to engage against the inner side face of the felly in the usual manner while detachable lugs 6 are disposed over the threaded ends of the lugs of the bolts for engagement with the outer side face of the felly and for cooperation with the adjacent portion of the demountable rim 3 in the manner well known in the art.

Figure 6:
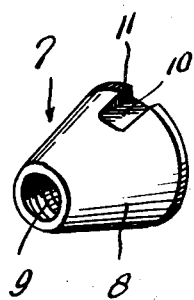
Figure 6 is a detail perspective view of the nut per se.

In lieu of the ordinary nuts that are threaded on the threaded ends of the bolts 5 to secure the lugs 6 in position, I provide a special nut shown generally at 7 on Figure 6 of the drawings. The nut includes a conical-shaped body 8 that is formed with a central threaded bore 9 to receive the threaded end of the respective bolt 5.

Formed in the inner end portion of the conical-shaped body 8 and at the conical outer face thereof is the axially extending notch 10, the opposed sides thereof constituting shoulders 11, the purpose of which will be presently described.

For the purpose of turning the nut 7 on the threaded end of the respective bolt for either tightening or loosening the nut, there is provided a special wrench or tool shown generally at 12 in Figure 7 of the drawings. This tool includes a shank 13, the intermediate portion of which is formed with a substantially U-shaped handle portion 14. An enlarged head 15 is secured on the outer end of the shank 13 while an enlarged conical-shaped socket member 16 is formed on the other end of the shank 13. This socket member is provided with the conical-shaped socket 17 to receive the similar shaped nut 7 and formed on the inner face of the socket adjacent the open outer end thereof is the rib or tooth 18 that is adapted to cooperate with the notch cut-out portion 10 formed in the inner end portion of the conical-shaped nut 7 in a manner to be presently described.

The socket 17 is disposed over the conical-shaped nut 7 so that the rib 18 will be disposed within the notch 10 and the sides of the rib will cooperate with the shoulder-forming sides 11 of the notch or cut-out portion 10 to effect the turning of the nut on the threaded end of the bolt when the shank is turned and obviously by rotating the nut in one direction, the same will be driven home to abut against the outer face of the lug 6 whereby to positively secure the lug in clamping engagement with the outer face of the felly and the demountable rim.

After all of the nuts have been driven home, the tire supporting rim will be mounted on the vehicle wheel against displacement and it will be impossible to remove the tire carrying rim from the wheel with an ordinary lug-nut or monkey wrench.

Whenever it becomes necessary to remove the tire carrying rim from the vehicle wheel felly, the tool 12 must be employed and when the socket 17 is properly fitted over the nut 7 so that the rib or tooth 18 engages in the notch 10, the nut may be readily and easily removed from the threaded end of each bolt.

It will thus be seen from the foregoing description, that I have provided an improved nut construction for association with the securing means for a demountable rim that will at all times be positive and efficient in carrying out the purposes for which it is designed and by the use of a special nut and tool of the character such as is embodied in the present invention, it will be impossible for any unauthorized person to remove the tire supporting rim from the wheel.

While I have shown the preferred embodiment of my invention, it is to be understood that minor changes in the size, shape and arrangement of parts may be resorted to without departing from the spirit of the invention or the scope of the appended claim.

What is claimed is:

A nut of the character described comprising an integral body in the form of a truncated cone and having a threaded axial bore, said body having a longitudinal groove in its external tool-engaging surface extending from the larger inner end of the body to a point intermediate the ends of the same, the bottom of said groove being parallel with the axis of the body and merging with said tool-engaging surface at said intermediate point.

In testimony whereof I affix my signature.

WALMER L. ROCKSTAD.